W. C. F. ZIMMERMAN.
DRAFT APPARATUS.
APPLICATION FILED SEPT. 20, 1913.

1,202,144.

Patented Oct. 24, 1916.

Witnesses
H. H. Lybrand
C. H. Fesler

Inventor
William C. F. Zimmerman,
By Edgar M. Kitchin
Attorney

UNITED STATES PATENT OFFICE.

WILLIAM C. F. ZIMMERMAN, OF LONE TREE, IOWA, ASSIGNOR TO ZIMMERMAN STEEL CO., OF LONE TREE, IOWA.

DRAFT APPARATUS.

1,202,144.  Specification of Letters Patent.  Patented Oct. 24, 1916.

Application filed September 20, 1913. Serial No. 790,819.

*To all whom it may concern:*

Be it known that I, WILLIAM C. F. ZIMMERMAN, a citizen of the United States, residing at Lone Tree, in the county of Johnson and State of Iowa, have invented certain new and useful Improvements in Draft Apparatus; and I do hereby declare the following to be a full, clear, and exact description of the invention, such as will enable others skilled in the art to which it appertains to make and use the same.

This invention relates to improvements in draft apparatus, and more particularly to cable team hitches such as are especially adapted for transmission of high tension stresses, such as are incident to operating stump pulling sweeps, dragging stone boats, harrows, plows and the like.

The object in view is the provision of means for enabling an easy and ready connection or hitch to the part to be drawn, which hitch shall be absolutely safe even under the greatest strains and in the most hazardous positions.

A further object in view is the production of a cable team hitch which is light, strong and easily handled.

With these and further objects in view, as will in part become apparent and in part be hereinafter stated, the invention comprises certain novel constructions, combinations and arrangements of parts as will be hereinafter specified and claimed.

Figure 3:
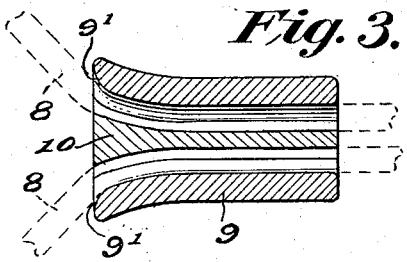
Figure 1:
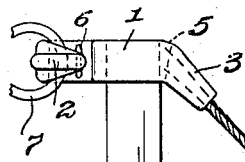
Figure 1:
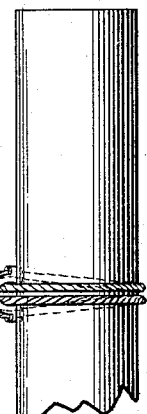
Figure 4:
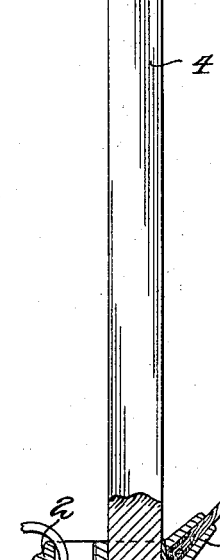
Figure 4:
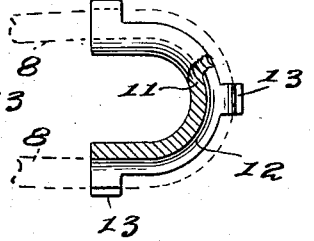
Figure 5:
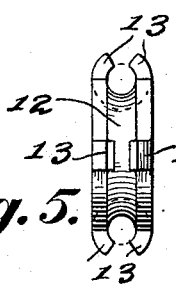
Figure 2:
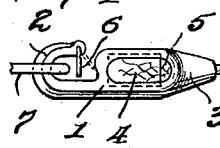

In the accompanying drawing,—Figure 1 is a plan view of a hitch embodying the features of the present invention, parts being seen in horizontal section. Fig. 2 is an edge view thereof. Fig. 3 is an enlarged, detail, horizontal section through the ferrule. Figs. 4 and 5 are detail views of the thimble.

Referring to the drawing by numerals, 1, 1 indicate the draft receiving members, each preferably consisting of an eye from which extends forwardly a hook 2 and rearwardly a socket 3, the socket, eye and hook being cast integral or otherwise formed rigidly together, and the two eyes being maintained spaced apart by an interposed spacing bar 4 whose ends enter the eyes and are slightly reduced for admission into the eyes so as to maintain the eyes spaced apart. As a means of firmly retaining the spacer 4 in place, a wedge 5 is driven into each eye at one side of the respective end of the spacer bar. A keeper 6, consisting preferably of a pivoted link, engages the free end of each hook 2, and is adapted to prevent accidental dislocation of the ring or other engaging device 7 from the hook, the said ring being connected to the swingletree or other apparatus to which the draft animal is hitched.

A cable 8 is arranged with its end portions extending into the respective sockets 3, the bore of each socket being flared forwardly and the strands of the cable being spread in the enlarged portion of the respective socket and interfilled with babbitt or other appropriate material. The cable 8 having its ends thus connected extends outwardly in the form of a loop, and to cause the loop to have its members or legs contracted abruptly so as to leave parallel portions of the cable, a ferrule 9 surrounds the cable and consists of a tubular sleeve, as clearly seen in Fig. 3, with one end flared, as indicated at 9', and corresponding substantially with the angle of the cable portions or legs and rounded so as to avoid danger of having the strands of the cable severed or injured by contact with the end portions of the ferrule. The ferrule is preferably held against slipping longitudinally of the cable by having those portions of the bore of the ferrule unoccupied by the cable filled with babbitt, as indicated at 10. At the extreme terminus of the parallel portions of the cable beyond the ferrule 9 a U-shaped thimble 11 is fitted between and engages the cable, the said thimble having an outwardly opening channel 12 into which the cable is disposed and in which it is held by retaining lugs 13, 13 formed integral with the thimble and clamped about the cable, as by being swaged thereover.

In operation the cable may be connected to the element to be drawn in any of various ways, as for instance the thimble 11 may be disposed in the clevis of a plow or otherwise caused to engage the device to be drawn, and when so positioned it will be observed that the thimble effectively protects the strands of the cable against being cut or otherwise injured by contact with the engaged apparatus. As seen in Fig. 1, it is preferable to connect the cable, when applied to a circular body, by forming the cable into a loop with the parallel portions passed through the thimble 11, as clearly seen in Fig. 2, and looped about the circular element. When so disposed, the thimble 11 effectively protects the crossed portions of the cable and prevents either from cutting the other. The circular or cylindrical body shown in Fig. 2 indicates the outer end portion of the sweep of a stump pulling apparatus, and the present improved hitch is especially well adapted for such application as it is designed and constructed to be absolutely impossible to be broken by the draft stresses of two horses.

What I claim is:—

1. In a draft apparatus, spaced draft receiving members, a cable having its end portions connected thereto, a ferrule surrounding the cable at an intermediate point in the length thereof for retaining portions of the cable against separation, and means in the ferrule for preventing the ferrule from moving longitudinally of the cable.

2. In draft apparatus, spaced draft receiving members, a cable connected thereto, a ferrule engaging portions of the cable for preventing spreading apart thereof, and means for preventing the ferrule from moving longitudinally of the cable.

3. In draft apparatus, spaced draft receiving members, a cable having its end portions connected to the respective members, and a ferrule surrounding intermediate portions of the cable for confining the portions of the cable from spreading apart, the ferrule being formed with a flared portion directed toward the draft receiving members, and shaped to conform to the spread of the portions of the cable toward said members.

4. In draft apparatus, spaced draft receiving members, a cable having its end portions connected thereto, the cable being formed into a loop, a ferrule engaging the members of the loop for retaining the same against spreading, and retaining portions of the cable substantially parallel and terminating in a final loop, and a thimble disposed in and engaging the final loop for protecting the cable thereat.

5. In draft apparatus, eyes spaced apart, a spacer bar connecting the eyes, draft receiving means outstanding from each of the eyes at one side of the spacer bar, a socket connected with each of the eyes at the other side of the respective eye and inclined at an angle toward the other socket, and a hitching cable having its respective ends fixed within the sockets.

6. In draft apparatus, a draft receiving member adapted to coöperate with a like member and comprising an eye having draft receiving means outstanding at one side and a socket outstanding at the other side, the socket being adapted to receive and retain a cable end.

7. In draft apparatus, a draft receiving member adapted to coöperate with a like member and comprising an eye, a hook outstanding at one side of the eye, and a socket outstanding at the other side of the eye and disposed at an angle to the axis of the eye, the socket being formed with a bore flaring toward the eye.

In testimony whereof I affix my signature in presence of two witnesses.

WILLIAM C. F. ZIMMERMAN.

Witnesses:
J. E. ASHTON,
F. T. ATKINS.

Copies of this patent may be obtained for five cents each, by addressing the "Commissioner of Patents, Washington, D. C."